Oct. 8, 1940.                D. ROBERTS                 2,216,830
            CONTAINER FOR PREVENTION OF HEAT AND COLD TRANSFER
                          Filed Aug. 31, 1937

INVENTOR.
Dudley Roberts
BY
Samuel Ostrolenk
ATTORNEY.

Patented Oct. 8, 1940

2,216,830

UNITED STATES PATENT OFFICE 2,216,830

CONTAINER FOR PREVENTION OF HEAT AND COLD TRANSFER

Dudley Roberts, New York, N. Y., assignor to Rubatex Products, Inc., New York, N. Y., a corporation of Delaware Application August 31, 1937, Serial No. 161,744

1 Claim. (Cl. 220—9)

My invention relates to an insulation unit and more specifically relates to a thermos jug and the method of making the same. This application relates to the subject matter of Patent No. 2,091,335 to Roberts et al.

Thermos containers have long been made by using double walled glass containers with a vacuum between the double walls, the vacuum being an excellent barrier to the conduction of heat or cold thereacross and serving to effectively insulate the material contained therein. Pitchers have been made employing this principle.

These vessels have been very effective for the purpose of maintaining hot or cold materials, but serious obstacles have arisen to their use. The outstanding difficulty in connection with their use devolves on their fragile nature. Ordinarily, such containers are carried about in automobiles since they are useful primarily for the purpose of transportation of hot or cold materials. Such transportation customarily involves vibration and concussion enough in many instances to crack or completely break the glass walls of such thermos containers. Any such rupture of the glass walls completely destroys the effectiveness of the thermos container and renders it useless, since the vacuum is destroyed. Thus, any ordinary fall of a thermos container is quite likely to render it useless and engender expensive repair.

By thermos container throughout this specification, I mean a container adapted for carrying or storing materials from which it is desired to prevent transfer of heat or cold with reference to the influence surrounding the container. The materials in the container may be of solid, liquid or gaseous form.

The fragility of the glass walled thermos container is further illustrated by its susceptibility to crack or fracture under the influence of hot liquids. Thus, on many occasions, when hot fluids are poured into a thermos container, the rapid change in temperature is sufficient to fracture the glass inner wall of the container and render it useless. It is further noted that the thermos containers are customarily rather heavy in comparison to their size. This is because of the glass and metal construction that has hitherto been employed and the necessity for providing protection for the fragile glass lining.

Another important objection to the present day thermos container is its expense. To manufacture an apparatus in which a high vacuum can be maintained involves careful workmanship and quality ingredients. To effect the vacuum in the thermos container also is an expensive operation.

A further objection to the use of such thermos containers, with particular reference to thermos jugs and large mouthed containers of this nature, resides in the fact that the top piece ordinarily has little insulating value since the vacuum insulation covers only the sides and bottom of the container. In the case of large mouthed containers, there is serious heat or cold loss through the top.

My invention relates to a thermos container comprising a thin metal shell constituting a chamber, and expanded therein, to provide a filling of high insulation value, a rubber mix comprising small particles of expanded rubber of either open-celled or closed cell nature in combination with a binder, the binder containing a blowing agent adapted to evolve gas such as carbon dioxide or nitrogen.

The thermos container of my invention has metallic external and internal walls. Such metallic walls are well adapted to taking decorative or polished finishes on the outside and can be readily cleaned on the inside. Between these metallic walls and in engaging contact therewith is the expanded mass of rubber material with insulating gas cells therein. Such gas cells have a high insulating value and effectively block transmission of heat or cold. This structure is also unbreakable with respect to all ordinary use of such a container. The material is basically rubber in nature and is therefore flexible and resilient to sufficient extent to eliminate any possibility of fragility.

In contrast to the above discussed disadvantages of susceptibility to fracture under the influence of hot fluids and the comparatively high weight of the present day thermos container, the thermos container of my invention is unaffected by hot fluids and its utility can in no manner be impaired by fluids of any temperature. My thermos container is further very light in weight and, in fact, is surprisingly light in relation to its size. This is because it comprises a thin shell sheet of stamped metal as a wall container for the expanded rubber insulating material. The expanded rubber insulating material weighs on the order of 5 lbs. per cu. ft., which, when contrasted to the weight of 62½ lbs. per cu. ft. of water, is remarkably light.

The process of manufacture of my thermos container is relatively simple. No expensive operations are involved, and no intricate methods of manufacture are necessitated. The expansion of the insulation material in the double walled chamber is almost automatic in nature.

Another important advantage of the particular construction I set forth lies in the fact that a thermos container can be provided with a plurality of compartments for maintaining different foods or liquids therein, which it is not desired to contact. In the past this has been impossible because it has been necessary to provide a relatively small cork in the top of the container. In view of the vacuum nature of the insulation hitherto maintained, the top or the cork plug in the thermos container was the weakest point with respect to the insulation value. Necessarily therefore, the cork was maintained of as small an area as possible. In the thermos container of my invention, however, the top can be of the same construction as the side walls and the top necessarily maintains as high an insulation as do the side walls or bottom. I can therefore provide a top opening of relatively large area. Because of this top opening of relatively large area, it is possible to make compartments in the container which are now accessible through this large top area and in which separate foods or fluids can be maintained. This multiplicity of compartments for separate foods is of great utility especially with respect to picnic foods for which such containers are customarily employed.

I have found that I can maintain in this multi-compartmented thermos container both hot and cold foods or liquids at the same time. To do this I provide insulated compartments in the container that are sealed from one another and which are readily accessible through the open mouthed top. Without adding any complex operations to the process except a simple modification of the metallic shells, I can provide such compartments.

Although the container for prevention of heat and cold transfer which I have described comprises a metal or insulation chamber wall material with gas expanded rubber contained therein, it is also within the purview of my invention to form such a container from closed cell gas expanded rubber alone or a mixture of closed cell gas expanded rubber with particle sections of open cell gas expanded rubber. When a container is made of this expanded rubber material without the metal or similar insulation chamber surrounding it, it is necessary to impart to the surfaces of such container a treatment that will insure a protection to the materials adapted to be contained within such container against the deleterious effects of the rubber. Such protection can be afforded by a sheet metal interior. If it is not desired to use sheet metal, a liquid metal may be used. Thus a metal may be sprayed thereover or a coating of plastic material as in lacquer form may be imparted by any suitable process such as dipping, spraying or brushing. Suitable lacquers may comprise vinyl compounds, cellulose derivative compounds, rubber chloride or rubber hydrochloride.

In addition to being applied to the expanded rubber in the form of liquids such coating compounds may be applied in the form of thin veneers either prior to or subsequent to the final expansion and curing of the gas expanded rubber. Thus an expanded rubber may be expanded in contact with the veneer to secure a firm contact therewith.

The object of my invention is to provide an unbreakable thermos container.

Another object of my invention is to provide a thermos container of high heat and cold insulating values.

A further object of my invention is a simplified construction for a thermos container.

Still a further object of my invention is to provide a thermos container in which a uniform insulation chamber extends completely around the container and top thereof.

Another object of my invention is to provide a multi-compartmented thermos container.

Another object of my invention is to provide a thermos container in which both hot and cold materials can be maintained and transported.

Another object of my invention is to provide a heat container adapted to prevent the transfer of heat and cold by means of a closed cell gas expanded rubber material.

Another object of my invention is to provide a container adapted to prevent the transfer of heat or cold comprising a metal insulation chamber and gas expanded rubber contained therein.

Another object of my invention is to provide a container adapted to prevent the transfer of heat or cold comprising a metal shell and closed cell gas expanded rubber expanded therein.

Another object of my invention is to provide a container adapted to prevent the transfer of heat or cold in which an insulating top of relatively large diameter is employed.

Figure 1:
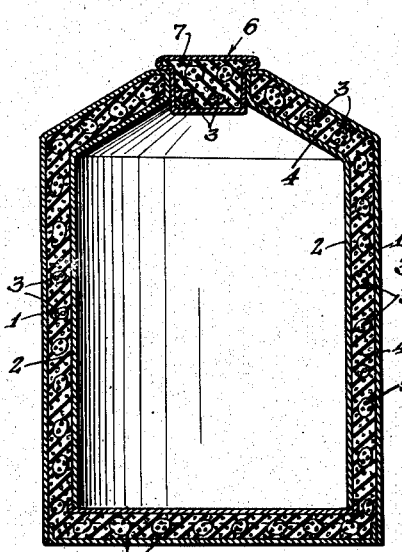
Figure 1 represents a cross-section of a thermos container of our invention.

Referring now more specifically to the drawing, in Figure 1 is shown an outer metal wall 1 spaced from an inner metal wall 2. Between and in close contact with these walls 1 and 2 is the expanded rubber insulating material 3 of my invention. This material consists of an expanded binder material 4 and small particles of expanded rubber 5 located therein. A closure member 6 comprises a thin stamped metal chamber 7 containing therein the gas expanded insulating material 3 discussed above.

Figure 2:
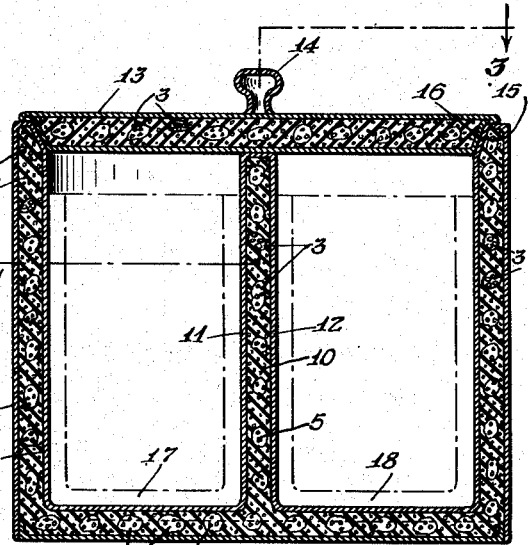
Figure 2 represents a cross-sectional side elevation of a compartmented thermos container of my invention.

In Figure 2 is shown a compartmented thermos container. There, between stamped metallic walls 8 and 9, is the expanded insulating material 3. Dividing the container into any desired number of compartments is an insulating wall comprising stamped metal sheets 11 and 12 with the insulating material 3 contained therein. If desired, the sheet metal that forms the containing walls can be stamped in continuous form to provide a chamber to contain the insulating expanded material 3. Other obvious mechanical modifications permit the use of separate units in assembly relation. Set in this thermos container is a similarly constructed top to provide an airtight seal for the container. The top consists of a metallic chamber 13 containing the insulating material 3. A convenient lifting means 14 can be incorporated in the top either integrally or by subsequent attachment.

In order to secure a good fit between the top 13 and the side walls of the container the slope 15 is imparted to the side walls and a corresponding slope 16 is given to the side walls of the top closure member. Thus a secure friction fit is assured when the container is closed. Preformed containers 17 and 18 may be used within the jug to insure portability of the contained fluids or foods. These containers may be of closed cell gas expanded rubber or any suitable material.

Figure 3:
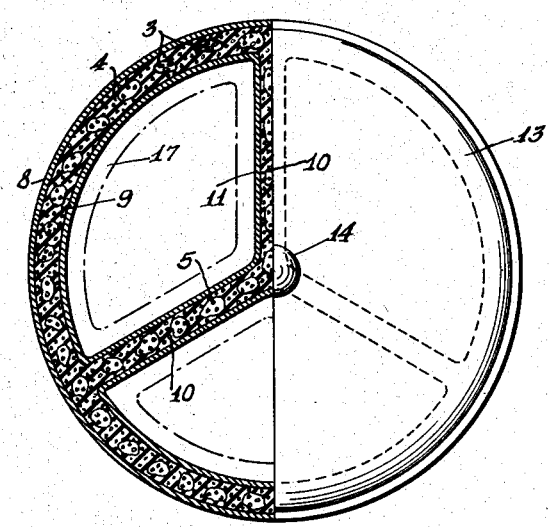
Figure 3 is a plan cross-section of the compartmented container shown in Figure 2 taken along the line 3—3 of Figure 2.

Figure 3 shows the compartmented thermos container in plan view with the separating walls 10.

I shall now give a specific illustration of the manufacture of the thermos container of my invention. I first take a composition comprising small particles of gas expanded rubber. For purposes of the best insulation I prefer closed cell gas expanded rubber, although the open celled gas expanded rubber being sealed subsequently, as will be shown, has a certain utility. With these small particles of gas expanded rubber is mixed a low temperature setting rubber compound containing a chemical blowing agent. The chemical blowing agent can be selected from two groups. The first is a mixture of chemicals adapted to react under certain influences to evolve a gas. An example of such a combination is sodium nitrite and ammonium chloride. The second group includes chemicals which decompose and evolve gas under the influence of certain effects, such as for instance, heat.

This mixture is poured into the enclosed space between suitably shaped stamped metal walls as shown in Figures 1, 2 and 3. The metal walls with the rubber mix contained therein is then placed in a heating chamber under the influence of heat. This heat causes the chemical blowing agent to decompose and evolve a gas. The gas evolved is trapped in the cells throughout the mass forming a gas expanded cellular rubber insulating structure. Proper control of the conditions of the material results in a closed cell structure. Further application of heat results in the permanent cure of the insulating material in its expanded form.

The stamped metal walls are relatively thin and, although they provide sufficient strength for the thermos container, they do not materially increase its weight. As pointed out above, the insulation materials weigh about 5 lbs. per cu. ft. Thus it can be seen that the entire unit is quite light in weight which in itself is an important attribute.

If desired, in the multi-compartmented thermos container, all the walls may be stamped to final shape in a single operation. The material is poured in through an opening and the opening sealed. The expansion of the rubber, as above set forth, acts to completely fill all spaces within the walls to provide complete insulation therefor.

Although I have particularly set forth a rubber mix comprising small particles of preformed expanded rubber material in combination with a rubber cement containing a blowing agent, I do not wish to be limited to this particular compound. I have found that a rubber mix comprising ordinary rubber with a suitable modifier and a chemical blowing agent can be expanded in the same manner as the mix containing the particles of gas expanded rubber. This mix is a more homogeneous mix, and, although its cost is slightly higher, its insulating values are possibly superior.

I have also found that I can gas a rubber mix by external pressure and insert that between the metallic walls and expand it therein.

I have found that a closed cell structure expanded to as great an extent as possible makes for the finest insulation. The insulation value of the material resides in the multiplicity of small gas containing cells homogeneously extending throughout the material. These cells of gas are rubber enclosed and rubber in itself is a naturally poor conductor. The gas contained in the cells is an inert gas and particularly low in thermal conductivity. Its physical structure as set forth, as can readily be seen, has excellent properties of insulation.

Since a wall of this insulation can be positioned between respective compartments, both hot and cold materials can be used in the same container. The high insulating value of the material is an effective barrier to the transmission of heat and cold.

The expansion of the material in the metallic walls effects a bond between said expanded rubber and the metal sheets so that no adhesive is necessary to maintain the insulation material in contact with the walls. In this connection, it is further to be noted that expansion completely fills the chambers so that there is necessarily friction contact.

If desired, a certain amount of sponge rubber with a chemical blowing agent incorporated therein may be employed. Since this material can expand only when given the space and has no real positive pressure such as the expanding closed cell rubber set forth above, the sponge rubber is of utility causing a complete filling of odd spaces.

The top of the thermos container can be made by a similar process. A suitably shaped stamped metal comprising an enclosure is filled to the desired amount with an expandible composition as set forth above. Upon being subjected to heat the gas causes a suitable expansion of the rubber to completely fill the enclosure. Since this insulated top has an insulating value equal to the side walls and bottom of the container, it can be made of any desired size. As can be seen in Figure 2 of the drawing, in a large mouthed container the top should be inset to provide a mechanically sound insulating set up.

The insulation chamber which has been described throughout as being of a stamped metal may be of any other suitable material as for example a preformed plastic. Thus a suitable plastic such as a cellulose derivative or a vinyl resin or a phenol-formaldehyde condensation product may be molded to the desired shape and the expanded rubber placed or formed therein, as has been pointed out above with reference to the stamped metal insulation chamber.

I claim:

A self-insulating container adapted to prevent heat exchange comprising a hollow wall, open cell rubber in the form of small particles surrounded by a mass of closed cell gas expanded rubber contained therein and in intimate engagement with said hollow wall.

DUDLEY ROBERTS.